United States Patent
Öberg

[11] Patent Number: 5,749,189
[45] Date of Patent: May 12, 1998

[54] POST DEVICE

[75] Inventor: Dan Öberg, Danderyd, Sweden

[73] Assignee: Dekont Teknik AB, Danderyd, Sweden

[21] Appl. No.: 564,186
[22] PCT Filed: Jun. 13, 1994
[86] PCT No.: PCT/SE94/00573
  § 371 Date: Dec. 18, 1995
  § 102(e) Date: Dec. 18, 1995
[87] PCT Pub. No.: WO95/00708
  PCT Pub. Date: Jan. 5, 1995

[30] Foreign Application Priority Data

Jun. 18, 1993 [SE] Sweden ............... 9302126

[51] Int. Cl.⁶ ........................................ E01F 9/01
[52] U.S. Cl. .................. 52/298; 52/98; 52/295; 52/296; 52/297; 52/726.4; 52/736.1; 248/548; 248/900; 403/2; 404/10
[58] Field of Search ............... 52/98, 100, 298, 52/297, 296, 295, 726.4, 736.1; 248/548, 900; 403/2; 404/10

[56] References Cited

U.S. PATENT DOCUMENTS

| 833,577 | 10/1906 | Bueto | 52/298 |
|---|---|---|---|
| 2,625,815 | 1/1953 | Black | 52/298 X |
| 3,343,322 | 9/1967 | Lurkis et al. | 52/298 |
| 3,552,698 | 1/1971 | Kinney | 52/298 X |
| 3,563,502 | 2/1971 | Dayson | 52/298 X |
| 3,571,991 | 3/1971 | Doocy et al. | |
| 3,630,474 | 12/1971 | Minor | |
| 3,653,169 | 4/1972 | Jenner | 52/298 |
| 4,052,826 | 10/1977 | Chisholm | 403/2 X |
| 4,095,381 | 6/1978 | Garchinsky | 52/295 |
| 4,154,037 | 5/1979 | Anderson | 52/296 |
| 4,638,608 | 1/1987 | Coy | 52/98 |
| 4,662,139 | 5/1987 | Bollmann | 52/296 |
| 4,926,592 | 5/1990 | Nehls | 52/98 |
| 4,928,446 | 5/1990 | Alexander, Sr. | 403/2 X |

FOREIGN PATENT DOCUMENTS

| 973677 | 9/1975 | Canada | 403/2 |
|---|---|---|---|
| 2 678 655 | 1/1993 | France . | |
| 302 513 | 7/1968 | Sweden . | |
| 443 015 | 2/1986 | Sweden . | |
| 461 049 | 4/1989 | Sweden . | |

OTHER PUBLICATIONS

"Today's Design Trends. Tower offers beauty, strength", Electrical World, p. 43 Sep. 1969.

Primary Examiner—Wynn E. Wood
Assistant Examiner—Laura A. Callo
Attorney, Agent, or Firm—Shapiro and Shapiro

[57] ABSTRACT

A post device, which is yieldable when hit by a vehicle, comprises a post with a base having at least three spaced-apart fixtures fixedly attached thereto, and a foundation with a fixing device supporting at least three spaced-apart rods, which are arranged to cooperate with the fixtures, thereby securing the post to the foundation. The fixtures are arranged on the outside of the base and embrace the associated rods and are each provided with a through opening or slot which is oriented substantially in the longitudinal direction of the post. Stop devices each engage an associated rod and an upper portion of an associated fixture.

18 Claims, 3 Drawing Sheets

1

POST DEVICE

BACKGROUND OF THE INVENTION

The present invention relates to a post device which is yieldable when hit by a vehicle, comprising a per se known post with a base having at least three spaced-apart fixtures fixedly attached thereto, and a per se known foundation with fixing means which support at least three spaced-apart rods which are arranged to cooperate with the fixtures for securing the post to the foundation.

More specifically, the invention relates to a lamp post or the like which, when hit by a vehicle, should permit detachment from its foundation, i.e., shearing-off from the foundation (breakaway-type posts).

Road lighting is mounted to increase road safety. Lamp posts are often extremely hard tubular constructions and, therefore, most dangerous in traffic. In Sweden, "collision-friendly" safety lamp posts were introduced at the end of the sixties, i.e., yieldable constructions which, when hit by a vehicle, catch and brake the vehicle in a relatively smooth fashion to make it stop such that its occupants fastened with a seat belt are not subjected to highly dangerous retardation. Up to now, tens of thousands of catch posts of different types have been mounted in Sweden.

In the U.S.A., among other countries, breakaway-type lamp posts have been mounted in about the same period of time. These posts differ from the catch posts by coming loose/being shorn off from the foundation when hit, being normally thrown in the air so as to hit the ground behind the vehicle. The breakaway idea is based on the fact that the vehicle has a residual velocity after hitting the post.

Breakaway-type posts have now also been introduced in Sweden and approved by the road authorities. The prevalent type of breakaway posts has a separating joint on ground level, which is relatively complicated and expensive to produce.

Swedish published application No. 443,015 discloses a "collision-friendly" post device, comprising a post whose entire base serves as a fixture, a foundation with a conical fixing means which is adapted to fit into the base, and a resilient locking sleeve for clamping thereof, thereby securing the post to the foundation. This post device thus requires a specially designed fixing means which is not adapted to be used together with conventional posts. Nor is it provided with directing means for adjusting the orientation of the post.

Furthermore, Swedish published application 461,049 discloses a "soft" post device which consists of a foundation with rod-shaped fixing means, and a post comprising a jacket and longitudinal internal rods which are adapted to be connected to the fixing means by means of friction joints. Also this post device relates to a special design of the post and, thus, also to specially designed fixing means, i.e., the above-mentioned friction joint, which means that the base does not rest directly on the foundation.

SUMMARY OF THE INVENTION

An object of the present invention is to provide a post device in which a conventionally designed post and a conventional foundation can be used.

A further object of the invention is to provide a post device which can withstand high wind loads and which is yieldable when hit by a vehicle.

One more object of the invention is to provide a post device which is relatively easy to mount and align and which is inexpensive to produce.

An additional object of the invention is to provide an attachment for a post, by means of which the post can be attached to a conventional foundation.

According to the invention, these objects are achieved by means of a post device as described above, which is characterised in that the fixtures are arranged on the outside of the base and enclose the respective rod and are formed with a through opening or slot which is oriented essentially in the longitudinal direction of said post, and that a stop element engages the associated rod and the upper portion of the associated fixture.

Further developments of the invention are described below.

BRIEF DESCRIPTION OF THE DRAWINGS

Preferred embodiments of the invention will now be described for the purpose of exemplification and with reference to the accompanying drawings in which.

DESCRIPTION OF THE PREFERRED EMBODIMENTS

Figure 1:
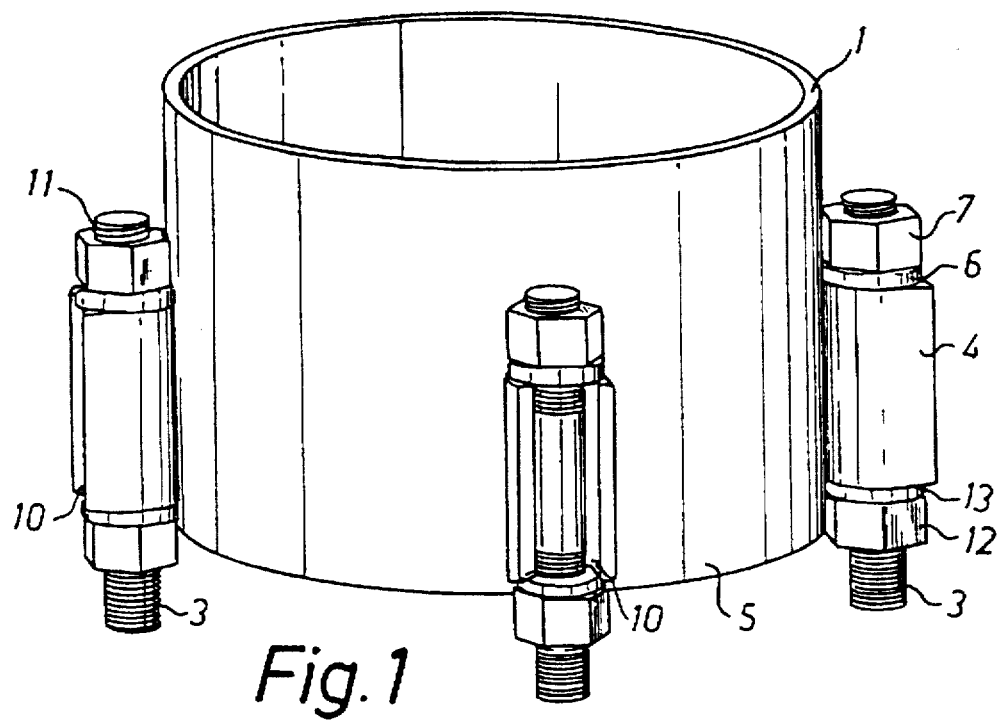
FIG. 1 is a perspective view of the lowermost portion of a post, i.e., the base, with its fixtures and rods which project from the foundation (not shown) and on which the fixtures are fixedly mounted.
Figure 2:
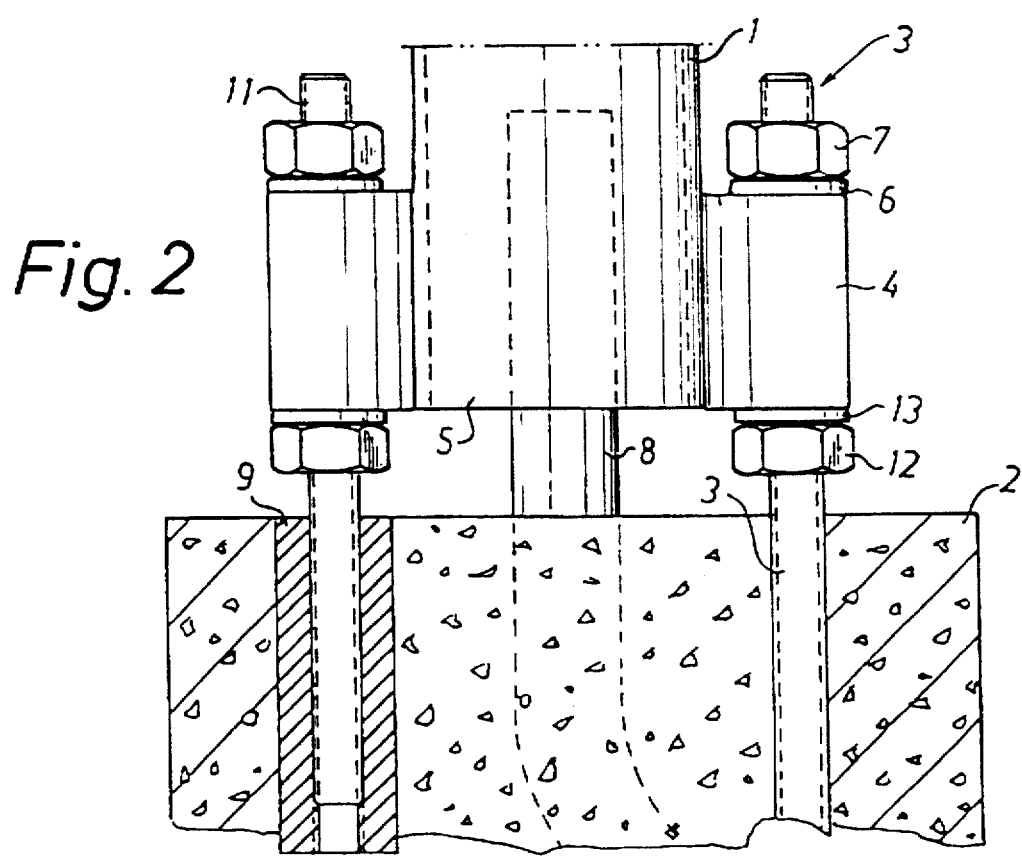
FIG. 2 is a vertical section of the base and the foundation.

With reference to FIGS. 1 and 2, the post device according to the invention, which is yieldable when hit by a vehicle ("collision-friendly"), preferably comprises a per se known post 1 with a base 5 having at least three spaced-apart fixtures 4 fixedly attached to the outside thereof, and a preferably conventional foundation 2 of concrete or like material with fixing device on means 9. In FIG. 2, the fixing means 9 is a metal sleeve cast into the concrete foundation 2 and provided with an internal thread, but may be designed in an optional manner, provided that it serves as anchoring element for at least three rods 3 projecting from the foundation. The rods 3 are adapted to cooperate with the associated fixtures 4 so as to secure the post to the foundation. When erecting the post 1, the rods 3 are introduced into and enclosed in the respective fixture 4 formed with a through opening or slot 10 which is oriented essentially in the longitudinal direction of the post from the uppermost to the lowermost portion of the fixture, as illustrated in FIG. 1.

The fixture 4 is shown to have the shape of a relatively short, U-shaped lug, but it may also be V-shaped or cylindrical with a narrow, longitudinal, wholly or partly through slot. It is also possible to form the fixture of a pair of flanges or metal plates extending from the base 5 in the radial direction thereof, cf. FIG. 3.

The openings or slots 10 are shown to be oriented radially away from the base, but may also be oriented essentially tangentially towards the circumference of the post, i.e., perpendicular to the first-mentioned orientation, or at an optional angle thereto.

The post 5 is defined above as the lowermost portion of a post, but may of course be a separate unit or attachment which is then attached to the lower part of the post by welding or the like, or which is arranged on the outside thereof for fixed engagement.

The rods 3 preferably have a threaded, upper portion 11 and a cooperating stop element in the form of a nut 7 with a thread matching that of the portion 11. A washer 6 can be arranged between the nut 7 and the upper portion of the fixture 4. As shown in FIGS. 1 and 2, a second nut 12 and an associated washer 13 can also be arranged on the bolt-shaped rod 3, under the lower portion of the fixture 4 and in engagement therewith. The illustrated construction permits the orientation of the post to be easily adjusted by means of the lower nuts 12. Finally, FIG. 2 shows a drum 8 for electric cables which extends from the interior of the post and through the foundation 2.

Figure 3:
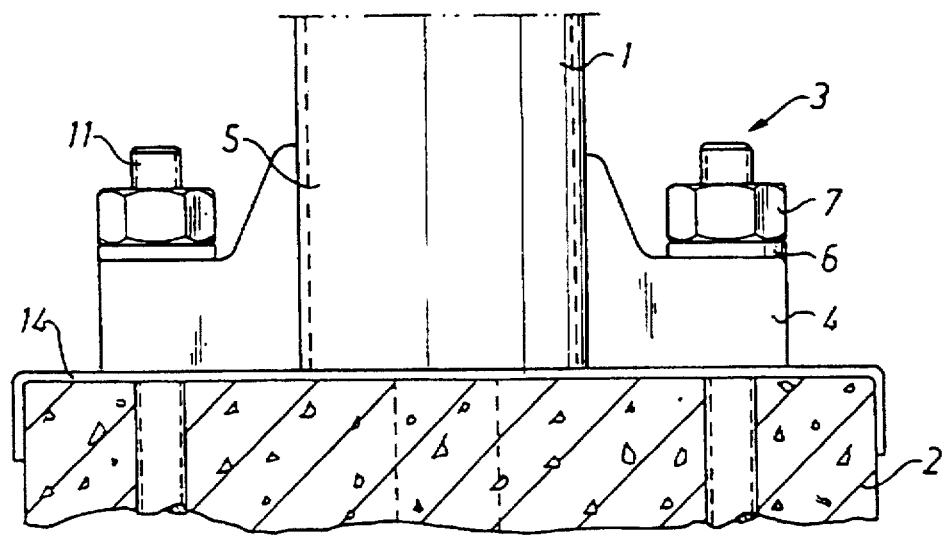
FIG. 3 is a schematic view of the base resting on the foundation, and with an alternative design of the fixtures.

Instead of resting on the nuts 12 and the washers 13, the fixtures or lugs 4, or the end surface of the post, may rest directly on the upper side of the foundation 2. Then it is advantageous to arrange a sheet element 14 therebetween, as illustrated in FIG. 3, thereby reducing the friction between these and the foundation. The sheet element 14 is preferably made of a metal or plastic material. It is also apparent from FIG. 3 that the part of the fixture 4, which is attached to the base 5 of the post, may be of greater length in the longitudinal direction of the post than the other parts of the fixture so as to achieve increased strength.

Figure 4:
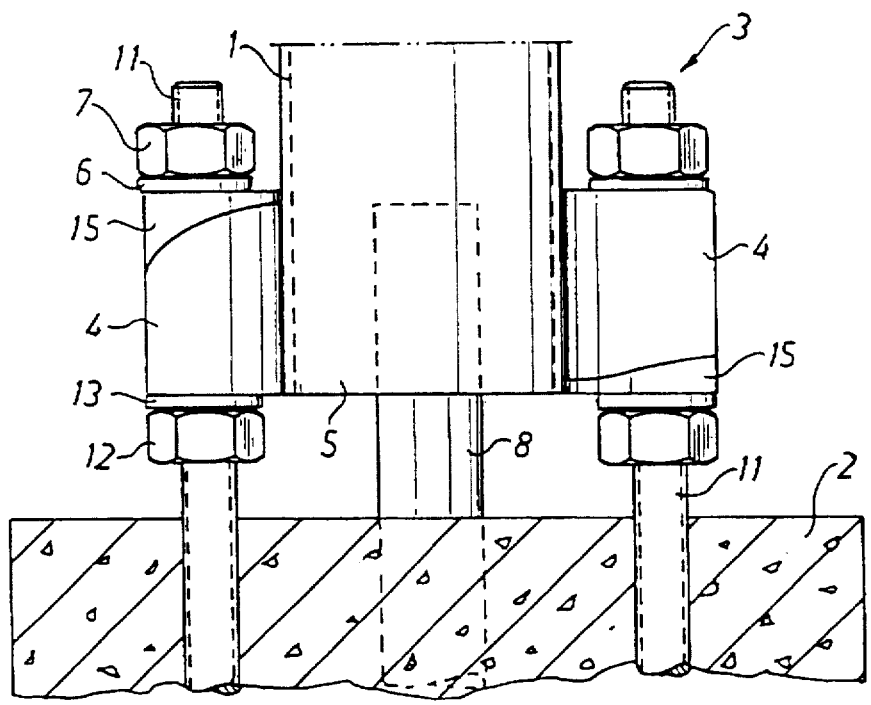
FIG. 4 is a schematic view of two additional, alternative embodiments of the fixtures.

FIG. 4 shows two alternative embodiments of the fixture 4. As shown to the left in the Figure, the fixture can also be formed with an upper rounded or bevelled portion to promote the yieldability of the post when hit by a vehicle. Between the nut 7 (washer 6) and the rounded/bevelled portion there is then arranged an insert 15 having a shape which is complementary to the rounded/bevelled portion, as illustrated in FIG. 4. If desired, the washer 6 can be integrated with the insert 15. The lower portion of the fixture 4 can rest on the washer 13, the nut 12, the sheet element 14, the upper side of the foundation 2, or it can be free, whereby the end surface of the post rests directly on the sheet element 14 or the upper side of the foundation 2, as in the above described embodiments of the post device according to the invention.

Reference is once more made to FIG. 4, the right part, showing that also the lower portion of the fixture 4 can be formed with a recess or bevelled portion. A complementarily formed insert 15 is, like in the left-hand fixture, arranged in this recess/bevelled portion.

In the embodiments described above, the fixing means 9 is a sleeve or an anchoring element attached to or integrated with the rod. However, it is also within the scope of the invention to design the fixing means as a horizontally oriented sectional device cast into the foundation, for example in the form of box girders with upwardly open, longitudinal slots positioned in the upper side of the foundation (not shown). The rods 3 may then consist of bolts which are displaceable along the above-mentioned sections, their heads being kept in the sections and their shanks extending through the slots.

Figure 5:
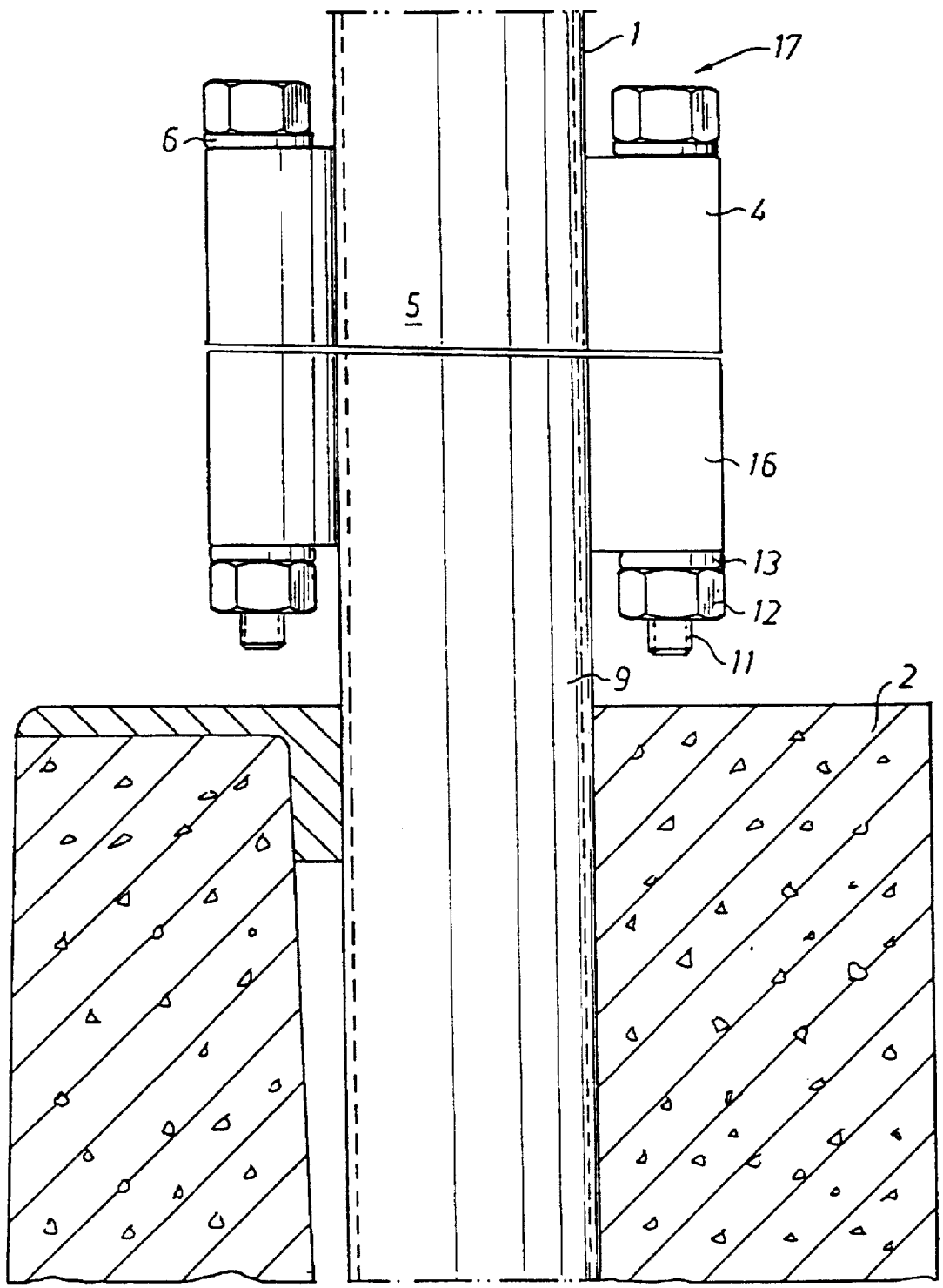
FIG. 5 is a schematic view of the foundation with an alternative fixing means.

As shown in FIG. 5, the fixing means 9 may also be designed as a sectional device arranged in the foundation, for example a tube, to which a suitable number of other fixtures 16 are fixedly attached. The fixing means may also be a sawn-off post cast into the foundation. These fixtures 16 can be designed in the same manner as the fixtures 4 discussed above, or they can be closed cylinders or bores in a joint sheet element (not shown). A bolted joint 17 is arranged in each pair of fixtures 4, 16, as illustrated in FIG. 5.

The inventive post device functions as follows. When hit by a vehicle, the base of the post is subjected to transverse forces owing to the kinetic energy of the colliding vehicle and to a bending moment which is transferred to the fixtures which are then deformed by the rods and the associated nuts (and washers as well as inserts), the fixtures being split open at their openings/slots and thus detached from the associated rods, whereupon the post comes loose and is thrown into the air. The post and the foundation will not be deformed to any considerable extent when hit by a vehicle.

The invention is not restricted to that described above and illustrated in the drawings, but may be modified within the scope of the claims. For example, sleeves of essentially the same length as the fixtures may thus be slipped over the rods and positioned between the rods and the respective fixtures. Moreover, the fixtures may be provided with indications to facilitate the splitting open when hit by a vehicle.

I claim:

1. A post device, yieldable when hit by a vehicle, comprising:

a foundation with a fixing device supporting at least three spaced-apart rods;

a post having a base with at least three spaced-apart fixtures rigidly fixed to an outside of the base, each fixture being slit at least partially through its thickness in a substantially longitudinal direction of said post and having embracing portions that embrace an associated one of said rods and that are able to deform when the post device is hit by a vehicle to release the associated rod from the embracing portions and allow the post device to yield without the fixture detaching from the outside of the base; and stop devices that each engage an associated one of said rods and an upper portion of the associated fixture.

2. A post device as claimed in claim 1, wherein each of said fixtures is a substantially U-shaped lug.

3. A post device as claimed in claim 2, wherein said slits are oriented radially away from a center of the base.

4. A post device as claimed in claim 2, wherein said slits are oriented substantially tangentially to a circumference of said base.

5. A post device as claimed in claim 1, wherein each of said fixtures is a substantially cylindrical lug.

6. A post device as claimed in claim 5, wherein said slits are oriented radially away from a center of the base.

7. A post device as claimed in claim 5, wherein said slits are oriented substantially tangentially to a circumference of said base.

8. A post device as claimed in claim 1, wherein each slit extends completely through the thickness of the fixture to provide a through opening.

9. A post device as claimed in claim 1, wherein each of said fixtures is elongated in said longitudinal direction.

10. A post device as claimed in claim 1, wherein said embracing portions include a pair of flanges extending substantially radially of said base.

11. A post device as claimed in claim 1, wherein each of said rods includes a threaded portion, and each of said stop devices includes a nut threadably received on the threaded portion of the associated rod.

12. A post device as claimed in claim 1, wherein each of said stop devices includes a washer that engages the upper portion of the associated fixture.

13. A post device as claimed in claim 1, wherein the upper portion of each of said fixtures tapers away from the base, and each of said stop devices includes a complementarily designed insert that engages the upper portion of the associated fixture.

14. A post device as claimed in claim 1, further comprising second stop devices that each engage an associated one of said rods and a lower portion of the associated fixture.

15. A post device as claimed in claim 14, wherein the lower portion of each of said fixtures tapers away from the base, and each of said second stop devices includes a complementarily designed insert that engages the lower portion of the associated fixture.

16. A post device as claimed in claim 1, wherein each of said stop devices has substantially the same cross dimension as the embracing portions of the associated fixture.

17. A post device as claimed in claim 1, wherein a sheet element is arranged between an end surface of the post and the foundation.

18. A post device as claimed in claim 1, wherein the fixing device comprises a sectional device fixedly attached to said foundation and supporting said rods.

* * * * *